(12) United States Patent
Nair et al.

(10) Patent No.: US 11,097,226 B2
(45) Date of Patent: Aug. 24, 2021

(54) SYSTEMS, DEVICES AND METHODS FOR MOLECULAR SEPARATION

(71) Applicant: GEORGIA TECH RESEARCH CORPORATION, Atlanta, GA (US)

(72) Inventors: Sankar Nair, Atlanta, GA (US); Christopher W. Jones, Atlanta, GA (US); Fereshteh Rashidi, Atlanta, GA (US); Ali Asghar Rownaghi, Atlanta, GA (US)

(73) Assignees: Phillips 66 Company, Houston, TX (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/688,231

(22) Filed: Aug. 28, 2017

(65) Prior Publication Data

US 2018/0056246 A1 Mar. 1, 2018

Related U.S. Application Data

(60) Provisional application No. 62/380,521, filed on Aug. 29, 2016, provisional application No. 62/526,100, filed on Jun. 28, 2017.

(51) Int. Cl.
*B01D 69/14* (2006.01)
*B01D 71/02* (2006.01)
(Continued)

(52) U.S. Cl.
CPC ......... *B01D 69/141* (2013.01); *B01D 53/228* (2013.01); *B01D 61/362* (2013.01);
(Continued)

(58) Field of Classification Search
CPC .. B01D 69/141; B01D 69/148; B01D 53/228; B01D 61/362; B01D 67/0051; B01D 67/0002; B01D 71/06; B01D 71/028
See application file for complete search history.

(56) References Cited

U.S. PATENT DOCUMENTS 4,925,562 A * 5/1990 te Hennepe .......... B01D 61/362
210/500.25
9,346,011 B2 5/2016 Koros et al.
(Continued)

FOREIGN PATENT DOCUMENTS

CN 105562059 A * 5/2016

OTHER PUBLICATIONS

Aroon MA. et. al. 2010. Performance studies of mixed matrix membranes for gas separation: A review.Separation and Purification Technology 75:229-242. (Year: 2010).*
(Continued)

*Primary Examiner* — Liam Royce
(74) *Attorney, Agent, or Firm* — Richard S. Echler; FisherBroyles LLP (57) ABSTRACT

Systems, devices and methods for molecular separation including a molecular separation device comprising at least a polycrystalline metal-organic framework (MOF) and a nanocrystalline, zeolite MFI, wherein the MOF forms a polycrystalline membrane with zeolite MFI nanoparticles dispersed therein, and the MOF membrane matrix contacting and surrounding the zeolite MFI nanoparticles form a permselective nanoporous structure.

4 Claims, 7 Drawing Sheets

(51) Int. Cl.
    B01D 71/06    (2006.01)
    B01D 67/00    (2006.01)
    B01D 61/36    (2006.01)
    B01D 53/22    (2006.01)
(52) U.S. Cl.
    CPC ..... B01D 67/0002 (2013.01); B01D 67/0051 (2013.01); B01D 69/148 (2013.01); B01D 71/028 (2013.01); B01D 71/06 (2013.01)

(56) References Cited

U.S. PATENT DOCUMENTS

| | | | | |
|---|---|---|---|---|
| 2009/0120875 A1* | 5/2009 | Liu | ........... | B01D 53/228 210/641 |
| 2011/0049056 A1* | 3/2011 | Wyndham | ........... | B01D 15/08 210/656 |
| 2016/0008771 A1* | 1/2016 | Yajima | ........... | B01D 63/066 210/500.25 |

OTHER PUBLICATIONS

Denny MS. 2015. In Situ Modification of Metal-Organic Frameworks in Mixed-Matrix Membranes.Angewandte Chemie International Edition 54:9029-9032. (Year: 2015).*
Rangnekar N. 2015. Zeolite membranes—a review and comparison with MOFs.Chem. Soc. Rev. 44:7128-7154. (Year: 2015).*
Kida K. 2013. Formation of high crystalline ZIF-8 in an aqueous solution.CrystEngComm 15:1794-1801. (Year: 2013).*
Kim J. et. al. 2002. Morphology, Crystalline Structure, and Properties of Poly(vinylidene fluoride)/Silica Hybrid Composites .Journal of Polymer Science: Part B: Polymer Physics 40:19-30. (Year: 2002).*
Guo et. al. 2006 "Hierarchical Growth of Large-Scale Ordered Zeolite Silicalite-1 Membranes with High Permeability and Selectivity for Recycling CO2" Angew. Chem. Int. Ed. 2006, 45, 7053-7056 (Year: 2006).*
Zornoza et. al. 2011 "Combination of MOFs and Zeolites for Mixed-Matrix Membranes" ChemPhysChem 2011, 12, 2781-2785 (Year: 2011).*
CN—105562059 translation (original and machine translation) (Year: 2016).*
Tanh Jeazet, H.B. 2016. "Increased selectivity in C02/CH4 separation with mixed-matrix membranes of polysulfone and mixed-MOFs MIL-101(Cr) and ZIF-8".Eur. J. Inorg. Chem. 2016, 4363-4367. DOI: 10.1002/ejic.201600190. (Year: 2016).*
Bux, H. 2010. "Ethene/ethane separation by the MOF membrane ZIF-8: molecular correlation of permeation, adsorption, diffusion". Journal of Membrane Science 369 (2011) 284-289. (Year: 2010).*
Lu et. al 2012 "Imparting functionality to a metal-organic framework material by controlled nanoparticle encapsulation". Nat. Chem.: 4:310-316 DOI: 10.1038/NCHEM.1272 (Year: 2012).*
Richard W. Baker and Kaaeid Lokhandwala, "Natural Gas Processing with Membranes: An Overview", Ind. Eng. Chem. Res. 2008, 47, 2109-2121 (13 pages).
Beatriz Seoane, Joaquin Coronas, Ignacio Gascon, Miren Etxeberria Benavides, Oguz Karvan, Jurgen Caro, Freek Kapteijn and Jorge Gascon, "Metal-organic framework based mixed matrix membranes: a solution for highly efficient CO2 capture?", Chem. Soc. Rev., 2015, 44, 2421-2454 (34 pages).
Lloyd M. Robeson, "The upper bound revisited", Journal of Membrane Science 320, 2008, 390-400 (11 pages).
Andrew J. Brown et al., "Interfacial microfluidic processing of metal-organic framework hollow fiber membranes", Science 345, 72, 2014, 71-75 (5 pages).
Ryan L. Burns and William J. Koros, "Defining the challenges for C3H6/C3H8 separation using polymeric membranes", Journal of Membrane Science 211, 2003, 299-309 (11 pages).
Xiaoli Ma, Suzanne Williams, Xiaotong Wei, Jay Kniep and Y.S. Lin, "Propylene/Propane Mixture Separation Characteristics and Stability of Carbon Molecular Sieve Membranes", Ind. Eng. Chem. Res. 2015, 54, 9824-9831 (8 pages).
Hyuk Taek Kwon and Hae-Kwon Jeong, "In Situ Synthesis of Thin Zeolitic-Imidazolate Framework ZIF-8 Membranes Exhibiting Exceptionally High Propylene/Propane Separation", J. Am. Chem. Soc. 2013, 135, 10763-10768 (6 pages).
Jian Yu, Yichang Pan, Chongqing Wang and Zhiping Lai, "ZIF-8 membranes with improved reproducibility fabricated from sputter-coated ZnO/alumina supports", Chemical Engineering Science 141, 2016, 119-124 (6 pages).
N. Rangnekar, N. Mittal, B. Elyassi, J. Caro and M. Tsapatsis, "Zeolite membranes—a review and comparison with MOFs", Chem. Soc. Rev., 2015, 44, 7128-7154 (27 pages).
Ioannis G. Giannakopoulos and Vladimiros Nikolakis, "Separation of Propylene/Propane Mixtures Using Faujasite-Type Zeolite Membranes", Ind. Eng. Chem. Res. 2005, 44, 226-230 (5 pages).
Chen Zhang, Ying Dai, Justin R. Johnson, Oguz Karvan and William J. Koros, "High performance ZIF-8/6FDA-DAM mixed matrix membrane for propylene/propane separations", Journal of Membrane Science 389, 2012, 34-42 (9 pages).
Hoang Vinh-Thang and Serge Kaliaguine, "Predictive Models for Mixed-Matrix Membrane Performance: A Review", Chem. Rev. 2013, 113, 4980-5028 (49 pages).
Chen Zhang, Kuang Zhang, Liren Xu, Ying Labreche, Brian Kraftschik and William J. Koros, "Highly Scalable ZIF-Based Mixed-Matrix Hollow Fiber Membranes for Advanced Hydrocarbon Separations", AIChE Journal, Jul. 2014, vol. 60, No. 7, 2625-2635 (11 pages).
Chen Zhang, Ryan P. Lively, Ke Zhang, Justin R. Johnson, Oguz Karvan and William J. Koros, "Unexpected Molecular Sieving Properties of Zeolitic Imidazolate Framework-8", 1-34 (34 pages).
Kiwon Eum, Ali Rownaghi, Dalsu Choi, Ramesh R. Bhave, Christopher W. Jones, Sankar Nair, "Fluidic Processing of High-Performance ZIF-8 Membranes on Polymeric Hollow Fibers: Mechanistic Insights and Microstructure Control", 1-29 (29 pages).
Kiwon Eum, Chen Ma, Ali Rownaghi, Christopher W. Jones and Sankar Nair, "ZIF-8 Membranes via Interfacial Microfluidic Processing in Polymeric Hollow Fibers: Efficient Propylene Separation at Elevated Pressures", ACS Appl. Mater. Interfaces 2016, 8, 25337-25342 (6 pages).
E. M. Flanigen, J. M. Bennett, R. W. Grose, J. P. Cohen, R. L. Patton and R. M. Kirchner, "Silicalite, a new hydrophobic crystalline silica molecular sieve", Macmillan Journals Ltd 1978, 512-516 (5 pages).
Brian J. Schoeman, "A spectroscopic study of the initial stage in the crystallization of TPA-silicalite-1 from clear solutions", Studies in Surface Science and Catalysis, vol. 105, 1997, 647-654 (8 pages).
Chil-Hung Cheng, Tae-Hyun Bae, Benjamin A. Mccool, Ronald R. Chance, Sankar Nair and Christopher W. Jones, "Functionalization of the Internal Surface of Pure-Silica MFI Zeolite with Aliphatic Alcohols", J. Phys. Chem. C 2008, 112, 3543-3551 (9 pages).
Mohamad H. Kassaee, David S. Sholl and Sankar Nair, "Preparation and Gas Adsorption Characteristics of Zeolite MFI Crystals with Organic-Functionalized Interiors", J. Phys. Chem. C 2011, 115, 19640-19646 (7 pages).
Athanassios D. Katsenis, Andreas Puskaric, Vjekoslav Strukil, Cristina Mottillo, Patrick A. Julien, Krunoslav Uzarevic, Minh-Hao Pham, Trong-On Do, Simon A.J. Kimber, Predrag Lazic, Oxana Magdysyuk, Robert E. Dinnebier, Ivan Halasz and Tomislav Friscic, "In situ X-ray diffraction monitoring of a mechanochemical reaction reveals a unique topology metal-organic framework", Nature Communications, 2015, 1-8 (8 pages).
F. Kapteijn et al., The Chemical Engineering Journal 57, 1995, 145-153 (9 pages).
Wridzer J.W. Bakker, Freek Kapteijn, Jeroen Poppe and Jacob A. Moulijn, "Permeation characteristics of a metal-supported silicalite-1 zeolite membrane", Journal of Membrane Science 117, 1996, 57-78 (22 pages).
Jurgen Caro, Martin Bulow and Wolfgang Schirmer, "Microdynamic of Methane, Ethane and Propane in ZSM-5 Type Zeolites", J. Chem. Soc., Faraday Trans. 1, 1985, 81, 2541-2550 (10 pages).

(56) References Cited

OTHER PUBLICATIONS

Jun-Ichiro Hayashi, Hirotaka Mizuta, Masatake Yamamoto, Katsuki Kusakabe and Shigeharu Morooka, "Separation of Ethane/Ethylene and Propane/Propylene Systems with a Carbonized BPDA-pp'ODA Polyimide Membrane", Ind. Eng. Chem. Res. 1996, 35, 4176-4181 (6 pages).

Nobuo Hara, Miki Yoshimune, Hideyuki Negishi, Kenji Haraya, Shigeki Hara and Takeo Yamaguchi, "Diffusive separation of propylene/propane with ZIF-8 membranes", Journal of Membrane Science 450, 2014, 215-223 (9 pages).

Nobuo Hara, Miki Yoshimune, Hideyuki Negishi, Kenji Haraya, Shigeki Hara and Takeo Yamaguchi, "Effect of Temperature on Synthesis of ZIF-8 Membranes fro Propylene/propane Separation by Counter Diffusion Method", Journal of the Japan Petroleum Institute, 58, 4, 2015, 237-244 (8 pages).

Junhang Dong, Y. S. Lin, and Wei Liu, "Multicomponent Hydrogen/Hydrocarbon Separation by MFI-Type Zeolite Membranes", AIChE Journal, Oct. 2000, vol. 46, No. 10, 1957-1966 (10 pages).

W. J. Koros, G. K. Fleming, S. M. Jordan, T. H. Kim and H. H. Hoehn, "Polymeric Membrane Materials for Solution-Diffusion Based Permeation Separations", Prog. Polym. Sci. vol. 13, 1988, 339-401 (63 pages).

* cited by examiner

SYSTEMS, DEVICES AND METHODS FOR MOLECULAR SEPARATION

CROSS REFERENCE TO RELATED APPLICATIONS

This patent application claims the benefit of U.S. Provisional Application No. 62/380,521 as filed Aug. 29, 2016, and U.S. Provisional Application No. 62/526,100 as filed Jun. 28, 2017. Both of the above applications are incorporated by reference herein.

TECHNICAL FIELD

The present disclosure relates generally to systems, devices and methods useful for efficient separation of a plurality of molecular species, and in a particular though non-limiting embodiment to molecular separation devices comprising porous polycrystalline membrane structures having at least one type of nanopore.

BACKGROUND

Conventional methods of molecular separation and purification, including distillation, rectification, extraction and crystallization, are both energy intensive and expensive. New membrane-based molecular separation processes have therefore been attempted to achieve sustainable large-scale chemical separation. Unfortunately, conventional polymeric membranes have not achieved the level of permeability, selectivity, and robustness required for successful commercial implementation.

A considerable body of literature describing 'hybrid' or 'mixed-matrix' membranes has developed over the past two decades, in which nanoparticles of a higher-performance, nanoporous material such as a zeolite, metal-organic framework (MOP), or two-dimensional layered structure are dispersed in polymeric membranes to improve performance while maintaining the superior processability of polymers. However, the performance of such membranes (as defined, for example, by Robeson-type 'upper-bound' curves) has been constrained by their associated polymeric matrix.

A broad range of materials such as polymers, carbon molecular sieves (CMS), MOFs, and zeolites have been fabricated into membranes for propylene separation. For example, polymer-based membranes have the advantage of improved processability as compared to nanoporous crystalline membranes, but suffer from a permeability-selectivity trade-off defined by the Robeson upper bound curve. In an effort to achieve improved membrane performance beyond this upper bound, hybrid (or 'mixed-matrix') membranes formed by dispersing highly selective and permeable molecular sieve zeolite, CMS, or MOF materials into the polymeric matrix have also been attempted.

However, the transport physics of mixed-matrix membranes (as described, e.g., by the Maxwell model) shows that the performance of such membranes is ultimately constrained by the properties of the polymeric matrix. Assuming sufficiently high loading (e.g., >40 vol %) of the dispersed phase in the polymer, incremental improvement in performance can be obtained over the baseline matrix polymer. However, manufacture of robust and defect-free mixed-matrix membranes with the required highly dispersed phase loadings has proven more difficult than anticipated.

There is, therefore, a longstanding but currently unmet need for systems, devices and methods for producing molecular separation devices having superior separation characteristics while avoiding the shortcomings of the prior art.

SUMMARY

A molecular separation device comprising a porous, polycrystalline membrane material, and a porous, nanocrystalline material, wherein the nanocrystalline material is dispersed within the polycrystalline membrane material, and wherein the nanocrystalline material provides a plurality of nanoporous structures. The polycrystalline membrane material and the nanocrystalline material form a mixed-matrix. The device can be permselective. In embodiments, the device is free of polymers formed from organic monomers. The polycrystalline membrane material may be free of polymers formed from organic monomers. Likewise, the nanocrystalline material may be free of polymers formed from organic monomers. The molecular separation device may comprise a completely nanoporous structure.

The device is configured to separate molecular species from liquids, gases and mixtures of liquids and gases. The device may be configured to separate azeotropes. The porous, polycrystalline membrane material may comprises a metal-organic framework (MOP) or covalent organic framework (COF). The porous, nanocrystalline material may comprise a zeolite, MOF, or COF. The nanocrystalline material dispersed within the polycrystalline membrane material may be further dispersed in a polymeric membrane to form a mixed-matrix membrane.

Exemplary methods for producing molecular separation devices are also provided. The methods include providing a porous, nanocrystalline material, and disposing the porous, nanocrystalline material in electrochemical communication with a growing nanoporous membrane material. An exemplary method comprises growing a porous polycrystalline membrane material from precursors, providing a porous, nanocrystalline material, and dispersing the porous, nanocrystalline material into the growing porous polycrystalline membrane material. The porous polycrystalline membrane can comprise an MOF or a COF. The MOF can comprise ZIF-8. The porous, nanocrystalline material can comprises a zeolite, MOF, or COF. A surface of the zeolite, MOF, or COF nanocrystalline material can be functionalized with amines or other groups to improve chemical compatibility of the nanocrystalline material with the polycrystalline material.

A wide variety of materials, fabrication methods, commercially viable uses, and methods and means for enhancing the performance of such devices are also disclosed.

DETAILED DESCRIPTION

The following detailed description of various embodiments of the instant disclosure will be enhanced by reference to the accompanying drawings, which illustrate specific though non-limiting aspects or features of the disclosure, and example methods by which they may be practiced. While the illustrative embodiments are described with particularity, it will be understood that various other modifications can be made by those skilled in the art without departing from the scope or spirit of the instant disclosure. Accordingly, it is not intended that the scope of the claims appended hereto be limited to the examples and descriptions set forth herein, but rather that the claims be construed as encompassing one or more of the patentably distinct features disclosed within the present specification, including logical and functional equivalents thereof.

Systems, devices and methods for molecular separation are generally disclosed herein. Generally, the molecular separation devices disclosed herein comprise a composite structure including at least two porous materials. In certain embodiments, one of the porous materials may comprise intergrown or contiguous grains of polycrystalline material ranging from micron, to sub-micron, to nano-scale in size, and are further configured to form a continuous membrane.

In various embodiments, the porous membrane material also comprises a second porous material, such as an occluding crystalline material, interspersed therein. In one embodiment, the occluding crystalline material is nano-scale in size, though in other embodiments the material is either larger or smaller for improved efficacy in various applications.

Generally, the molecular separation device disclosed herein comprises a composite assembly having a porous, polycrystalline membrane interspersed with a porous, crystalline material. In one embodiment, the molecular separation device is a permselective nanoporous structure characterized, generally, as a semipermeable membrane capable of ion exchange.

In various non-limiting example embodiments described herein, the specification generally discloses embodiments of the present disclosure comprising molecular separation devices having a mixed-matrix membrane, and further comprising a plurality of nanocrystalline members configured for molecular separation of specific target molecules, e.g., liquids or gases. The molecular separation devices generally comprise at least two nanoporous materials configured to form a polycrystalline membrane having nanocrystalline pores. The example embodiments disclosed herein are non-limiting, and it is understood that the materials forming the molecular separation devices disclosed herein may be selected from any other suitable materials. For example, the molecular separation devices disclosed herein may comprise materials including MOFs; zeolitic materials, e.g., ALPO, SAPO; silicalites; mixed metal oxides; various nanocrystalline, zeolite MFI, and combinations thereof, e.g., MOF-zeolite; MOF1-MOF2, and MOF1-MOF2-zeolite.

In one example embodiment, a nanoporous material comprising a nanocrystalline, metal-organic framework (MOF) and a nanocrystalline, zeolite MFI is provided, wherein associated MOF nanoparticles form a nanocrystalline membrane with zeolite MFI nanoparticles dispersed therein, and the MOF nanoparticles contacting the zeolite MFI nanoparticles form a permselective nanoporous structure.

Other embodiments comprise a porous, polycrystalline membrane material, and a porous, nanocrystalline material in which the nanocrystalline material is dispersed within the polycrystalline membrane material to form nanoporous structures. As such, example embodiments further comprise a mixed-matrix of porous, polycrystalline membrane material and nanocrystalline material.

Still further embodiments of the molecular separation device disclosed herein have a range of porosity. Other embodiments comprise completely nanoporous, mixed-matrix membranes (MMMs) consisting of a nanoporous polycrystalline membrane matrix having other nanoporous crystalline nanoparticles dispersed therein. In embodiments, varying degrees of selected amounts of filler nanoparticles are incorporated into the polycrystalline member matrix to provide different degrees of molecular separation selectivity, such as from about 10% to about 98% by weight filler nanoparticles. For example, in certain embodiments the molecular separation device includes ZIF-8 and: greater than about 10% by weight MFI nanoparticles; greater than about 20% by weight MFI nanoparticles; greater than about 30% by weight MFI nanoparticles greater than about 40% by weight MFI nanoparticles; greater than about 50% by weight MFI nanoparticles; greater than about 60% by weight MFI nanoparticles; greater than about 70% by weight MFI nanoparticles; greater than about 80% by weight MFI nanoparticles; greater than about 90% by weight MFI nanoparticles; greater than about 95% by weight MFI nanoparticles; or greater than about 98% by weight MFI nanoparticles.

The ZIF-8 is nanoporous, and has its own selectivity and permeability towards gases. The incorporated MFI is also nanoporous and also has its own selectivity and permeability. Together, the two nanoporous materials form a semi-continuous nanoporous membrane structure that has a separation performance that is some combination of the properties of each material. For example, the combination may have certain ranges of pore sizes. For example, in some combinations, the molecular separation device may have pores ranging in size from about 0.1 nm to about 1000 nm. In other embodiments, pore sizes range from about 0.1 nm to about 100 nm. In still other embodiments, pore sizes range from about 0.1 nm to about 10 nm. In still other embodiments, pore sizes range from about 0.1 nm to about 1 nm.

In still further embodiments, the molecular separation device comprises a polymer-free, crystalline, all-nanoporous structure. For example, ZIF-/MFI is polymer-free. The crystalline, all-nanoporous structure does not contain any polymer material, with polymer material being defined as polymers formed from organic monomers, such as polypropylene, polyimide, polysulfones, and polysiloxanes.

In still further embodiments the molecular separation device is used in a plurality of chemical separation applications and related processes, e.g., separation of closely related molecular species. Further example embodiments comprise a molecular separation device capable of separating molecules sharing a high degree of structural and chemical similarity. In one specific though non-limiting embodiment, a molecular separation device is provided for separation of an olefin-class molecular species from a paraffin-class molecular species, e.g., propylene/propane.

Olefins are typically produced in the petrochemical industry by, e.g., steam, thermal or catalytic "cracking" of paraffin-class molecular species, followed by repeated compression and distillation processes that separate the complex vapor mixtures. Overall, the process is effective but highly energy-intensive, and may be the single largest energy consumer and greenhouse gas contributor in the chemical sector. Thus, highly selected, membrane-based molecular separation devices such as those disclosed and claimed herein will contribute to energy-efficient alternatives for conventional olefin/paraffin separation systems.

Selected combinations of MOF and zeolite enable the molecular separation devices to separate mixtures of various properties and components, including mixtures of light gases, aqueous solutions of alcohols, mixtures of water and hydrocarbons, e.g., alkanes or higher alcohols, as well as mixtures of hydrocarbons, e.g., alcohol/alcohol, alcohol/alkane or alkane/alkane. Conventionally, such mixtures have been separated by distillation, but also by other methods such as absorption and adsorption.

However, distillation processes are energy consuming and cannot economically produce high purity compounds. For example, in the case of the separation of ethanol and water, the maximum ethanol purity that can be achieved in an economically viable manner is 95% ethanol, due to the presence of an azeotrope of the ethanol/water mixture that prevents purity above 96% ethanol without additional expensive measures. In addition, in case of dilute mixtures, i.e., relatively low amounts of ethanol disposed in water, large amounts of the water will need to be removed. Membrane-based molecular separation devices may provide an advantageous, alternative to liquid separation, e.g., azeotrope separation.

Other example embodiments provide molecular separation devices for the separation of fluid mixtures. The fluid mixture can be any mixture of liquids or gases. In certain embodiments, the molecular separation device is used to separate liquid mixture including water and/or at least one hydrocarbon compound. In other embodiments, the molecular separation device is used to separate gaseous mixtures, but not limited to, nitrogen, oxygen, carbon dioxide, methane, hydrogen, ethane, ethylene, hydrogen sulfide, sulfur dioxide, and/or halogens.

Still other example compounds for separation using the molecular separation devices of the present disclosure comprise hydrocarbons and oxygenates. Hydrocarbons are molecules consisting of carbon and hydrogen atoms, and may be either aliphatic or aromatic. Aliphatic hydrocarbons include alkanes, alkenes and alkynes, and may be linear, branched or cyclic. Aromatics include mono aromatics, poly aromatics, and substituted mono and poly aromatics, e.g., benzene, toluene, styrene and ethylbenzene.

Oxygenates are hydrocarbonaceous compounds, which, in addition to carbon and hydrogen atoms, include one or more oxygen atoms. Examples of suitable oxygenates include alcohols, aldehydes, ketones, esters and ethers. The oxygenates may be primary, secondary or branched oxygenates.

One example embodiment provides molecular separation devices capable of separating mixtures of molecular species based on pervaporative separation, which is a processing method for the separation of mixtures of liquids by partial vaporization through a membrane. In other embodiments the molecular separation devices comprise a selective membrane barrier disposed between two phases of the mixture, e.g., the liquid-phase feed and the vapor-phase permeate. Other embodiments of the molecular separation device are configured to allow separation of target molecular species of the liquid mixture to transfer through the membrane by vaporization. Other embodiments of the molecular separation device are configured to allow separation of target molecular species, including a mixture of two liquids having a constant boiling point and composition throughout distillation, e.g., azeotropes. Still further embodiments are configured to allow separation of target molecular species from gases. Still other embodiments are configured to allow separation of target molecular species from mixtures of liquids and gases.

Generally, pervaporative separation is based on a difference in the transport rate of individual components through the membrane. The molecular differences between components of a mixture create a chemical potential difference that can be used to drive separation of mixtures. For example, where the chemical potential differences exist in a liquid mixture, a liquid feed/retentate constitutes a remainder of the liquid that does not permeate, i.e., vapor permeate, through the membrane. Chemical potential differences may be expressed in terms of fugacity, given by Raoult's law for a liquid, and by Dalton's law for (an ideal) gas.

Further example embodiments provide molecular separation devices comprising nanoparticles having a high-performance nanoporous material, e.g., zeolite, MOF, or two-dimensional layered structures. In still further embodiments, the molecular separation devices comprise two or more associated nanoporous materials dispersed in a polymeric membrane or on the surface of a polymeric support in order to improve separation performance while maintaining the processing advantages associated with the use of polymers, for example a mixed-matrix membrane comprising a polymeric membrane occluded by an MOF phase that is loaded with zeolite nanoparticles.

The advent of MOF molecular sieves has created potential for more scalable membrane fabrication processes under relatively benign conditions. MOFs consist of metal centers connected by coordination bonds to organic linker molecules, and have been used to grow crystalline membranes through techniques similar to those developed for zeolitic membranes, as well as more recent flow-processing or interfacial growth techniques, such as Interfacial Microfluidic Membrane Processing (IMMP) methods discussed below. The zeolitic imidazolate framework (ZIF) subclass of MOFs has been found to be particularly effective for adsorptive and membrane separations, because of its tunable pore size and chemistry, and relatively good thermal and chemical stability. For example, the nanoporous structures within a ZIF membrane may allow separation of gases and liquids having similar molecular characteristics.

In fact, the vast range of MOF structures, e.g., ZIFs, allows for rational design, synthesis, and modification of MOF structures to produce membrane-based molecular separation devices to specifically separate liquids and gases, e.g., by either adsorptive separations or diffusion-based membrane separations, or a combination of both.

In addition, ZIF membrane processing can be scalable for industrial use. For example, scalable production of ZIF membranes can be achieved by synthesizing membranes on the outer surfaces of porous polymeric poly(amide-imide) hollow fibers having a ~250 μm outer diameter by a seeded growth process at mild conditions (65° C. in methanol solutions).

Alternatively, production of molecular sieving membranes on the inner surfaces of the hollow fibers, while much more challenging to grow, are better suited for scalable fabrication and industrial uses. For example, membranes grown on the inner surfaces of the hollow fibers frequently have the ability to be bundled in close proximity while avoiding membrane-membrane contact points and interfaces that lead to defects during synthesis.

However, ZIF membranes have limitations. For example, ZIF membranes produced using a single-linker ZIF material, for example, allow only discrete changes in pore size and adsorption characteristics by varying the linker, e.g., an imidazolate linker. Since diffusion-based molecular separations are extremely sensitive to small (<0.1 Å) changes in the effective pore size, only limited diffusive separations are possible with single-linker ZIF membranes. A specifically designed ZIF membrane must therefore be produced for each new separation target.

Similarly, adsorptive separations are sensitive to small changes in the hydrophilicity or organophilicity of the ZIF, which are difficult to design de novo. Accordingly, there is a need for an alternative to ZIF membranes having a single-linker species; therefore, embodiments of the instant disclosure provide a structurally advanced molecular separation more broadly applicable to industrial molecular separation needs.

Example embodiments of the molecular separation devices disclosed herein comprise a MMM having a crystalline membrane matrix, e.g., ZIF-8, and a crystalline dispersed phase, e.g., zeolite MFI configured to form nanoporous structures.

In other example embodiments, the molecular separation devices are produced using an interfacial microfluidic membrane processing (IMMP) method. IMMP processing methods offer a versatile platform for fabrication of molecular separation devices including, e.g., MMMs, in a single step on scalable hollow fiber supports.

The use of IMMP processing methods can overcome previously known challenges associated with producing or growing a defect-free polycrystalline nanoporous membrane matrix, while simultaneously incorporating crystals of a second nanoporous material with negligible interfacial defects.

In one example embodiment, use of IMMP methodologies allow for production of an MMM-based molecular separation device wherein a surface-treated nanoparticle of the zeolite MFI is incorporated in situ during growth of a polycrystalline membrane of the MOF ZIF-8.

Various other embodiments integrate the growth process of nanoporous polycrystalline membrane matrices with inclusion of one or more dispersed phase materials. For example, an MOF material, e.g., ZIF-8, can be characterized as a molecular sieving material with excellent propylene/propane permeation selectivity (>100), and used in the fabrication of high-quality membrane-based molecular separation devices. However, the propylene permeability of ZIF-8 (~390 Barrer at 308 K) is relatively low among nanoporous materials. To improve on the permeability of MOF membrane, additional nanoparticles, e.g., a zeolite MFI, are also incorporated.

Further embodiments comprise synthetic production of zeolite nanoparticles. In various embodiments, the zeolite synthesis employs reagents and materials including (but not limited to): tetrapropylammonium hydroxide (TPAOH, 20% and 40% w/w aqueous solution and 1M); tetraethylorthosilicate (TEOS, 98%); propane-1,3-diamine; 1-Octanol (99%); and deionized water.

In one example embodiment, the zeolite synthesis is performed by generating a precursor solution comprising TEOS, TPAOH (40%) and water at a molar ratio of 1 TEOS:0.36 TPAOH:20 $H_2O$. In further embodiments the TEOS is added dropwise into an aqueous TPAOH solution while stirring until the mixture becomes completely transparent, e.g., for about 1 hour. In still further embodiments additional DI water is added to the transparent solution while stirring for a predefined period of time, e.g., for about 24 hours, in order to achieve a desired molar ratio.

In other embodiments a hydrothermal reaction is achieved in a Teflon-lined Parr autoclave at about 150° C. for about 96 hours. In further embodiments still, the resulting MFI crystal suspension is centrifuged, washed with water, and then dried at about 100° C. in order to recover the crystals, which are then further calcined at about 550° C. for about 8 hours in air in order to remove TPA cations occluding pores.

In one example embodiment, zeolite nanoparticles are further processed to modify the zeolite nanoparticle surface. Surface functionalization is accomplished by treating the zeolite with an organic compound, e.g., amine. Organic functionalization of zeolite nanoparticles, e.g., MFI, is then performed under neat conditions as presently known in the art or under other conditions future devised offering similar efficacy.

In other embodiments, MFI particles are functionalized with an amine molecule, e.g., 1,3-diaminopropane. In one specific though non-limiting embodiment, 200 mg of calcined silicate-1 nanoparticles are degassed at about 150° C. for about 24 hours in a 100 ml flask. Subsequent to degassing, about 10 ml of an amine, e.g., 1,3-diaminopropane, is then added. The flask is optimally (though not necessarily) connected to a dry distillation head, and then purged with nitrogen for several minutes. Distillation is then conducted in a heated, silicone oil bath at about 95° C. for about 48 hours while stirring in order to functionalize the zeolite. In other embodiments, the zeolite is collected by centrifugation, washed with MeOH, dried, and then degassed at about 150° C. under vacuum for about 24 hours in order to remove unreacted organic molecules physisorbed in the pores.

In another example embodiment, the established IMMP methodology further comprises poly(amide-imide)(PAI) macroporous hollow fibers used as a support or substrate for producing molecular separation devices. The PAI hollow fibers can be produced by presently known, conventional spinning processes. Such PAI hollow fibers typically have a pore size of about ~400 nm and room-temperature $N_2$ permeance of about >70,000 gas permeation units. In one embodiment, a plurality of pre-treated, functionalized MFI nanoparticles are then added to a solution of zinc nitrate hexahydrate/1-octanol solution, e.g., 0.0185 mol $Zn^{2+}$/L, and sonicated to achieve dispersion of the functionalized MFI crystals. In one specific though non-limiting embodiment, the concentration of MFI nanoparticles in the resultant solution is about 2.75 g/L.

Various other embodiments comprise molecular separation devices having mixed-matrix membranes (MMMs), wherein the matrix further comprises a nanoporous material and the dispersed phase is also a nanocrystalline nanoporous material. Together, the polycrystalline matrix and nanocrystalline dispersed phase materials interact to form a molecular separation device having an all-nanoporous composite structures.

Other embodiments comprise molecular separation devices having an improved performance range that offer enhanced permeability and/or selectivity as compared to previously known, conventional materials. For example, relative to conventional polymers, the permeability of nanoporous materials are 2-3 orders of magnitude higher than polymers, while the molecular selectivity may be 1-2 orders of magnitude higher. Therefore, embodiments within the scope of the present disclosure may comprise molecular separation devices for separation closely related compounds, e.g., such as propylene/propane, that surpass any previously defined Robeson upper bound curves by including an appropriate combination of two (or more) nanoporous materials.

In various example embodiments, permeation measurements are made in order to evaluate or compare conventional molecular separation devices to molecular separation devices produced according to the methods of the present disclosure. In one embodiment, separation properties of binary, equimolar (50/50) $C_3H_6/C_3H_8$ mixture permeation are evaluated for pure ZIF-8 membranes and ZIF-8/MFI MMMs at about 25-120° C. The permeation measurements can be conducted in a steady-state 'Wicke-Kallenbach' mode, i.e., sweep gas on the permeate side, with an IMMP fabrication module also directly acting as a permeation membrane module. Before permeation measurements, fiber cross sections disposed at both ends of the membrane are sealed to prevent the feed stream from bypassing the membrane by permeation through the fiber cross-section at the two ends. Sealing of PAI hollow fibers promotes conduction by infiltrating the cross section of the fiber with a 9 wt % PDMS/heptane solution via capillary action followed by thermal crosslinking of the PDMS at about 120° C. for about 2 hours under Ar flow through the bore of the PAI hollow fiber. For permeation measurements, a 50:50 hydrocarbon feed mixture is introduced through the bore side at about 10 mL/min while an Ar sweep gas flowed across the shell side at about 10 mL/min to collect the permeate. A gas chromatograph with TCD and FID detectors is then used to determine the composition of the permeate. Permeation data should be measured for three different membranes synthesized under the same conditions for each case in order to obtain statistically significant average result data.

In one example embodiment, permeation measurements are calculated based on known and/or experimental results. In various embodiments, the Maxwell model, e.g., Eqn. S1, defines MMM permeability in terms of the permeabilities of the individual phases and the volume fraction of the dispersed phase:

$$P_{MMM} = P_m \left[ \frac{P_f + 2P_m - 2\varphi(P_m - P_f)}{P_f + 2P_m - \varphi(P_m - P_f)} \right] \quad (S1)$$

where $P_{MMM}$ is permeability in the mixed-matrix membrane; $P_m$ and $P_f$ are the permeabilities of the matrix phase, e.g., ZIF-8 and the particulate/dispersed phase (here MFI), respectively; and $\varphi$ is the volume fraction of the dispersed phase.

The permeability of any species (i) in a given phase can then be expressed, e.g., using Eqn. S2a below as a product of diffusivity ($D_i$) and solubility ($S_i$), with the solubility being calculated at a given partial pressure ($p_i$) using an adsorption isotherm such as the Langmuir isotherm, e.g., Eqn. S2b.

$$P_i = D_i \times S_i \quad (S2a)$$

$$S_i = \frac{C_i}{p_i} = \frac{C_{sat,i} b_i}{1 + b_i p_i} \quad (S2b)$$

Here $C_i$ is the adsorbed concentration at equilibrium, $C_{sat,i}$ is the Langmuir capacity constant, and bi is the Langmuir affinity constant.

Other example embodiments comprise molecular separation devices having a dispersed phase having superior molecular permeability and increased permeability even at moderate loadings without significant loss in selectivity. In embodiments of the present disclosure, the molecular separation device may be configured to have a pore-size ranging from about 0.1 nm to about 1 nm. In other embodiments of the present disclosure, the molecular separation device may be configured to have a pore-size ranging from about 0.1 nm to about 100 nm. In embodiments of the present disclosure, the molecular separation device may be configured to have a pore-size ranging from about 0.1 nm to about 10 nm. In various other embodiments, the molecular separation device is configured to have a pore-size ranging from about 0.1 nm to about 1 nm. In one specific though non-limiting embodiment, a molecular separation device having pure-silica ($SiO_2$) form of zeolite MFI, e.g., silicate-1, as the dispersed-phase material is provided. MFI is, in general, a medium-pore zeolite with an interconnected quasi-3D network of channels having an average pore size of about 0.55 nm.

Figure 1:
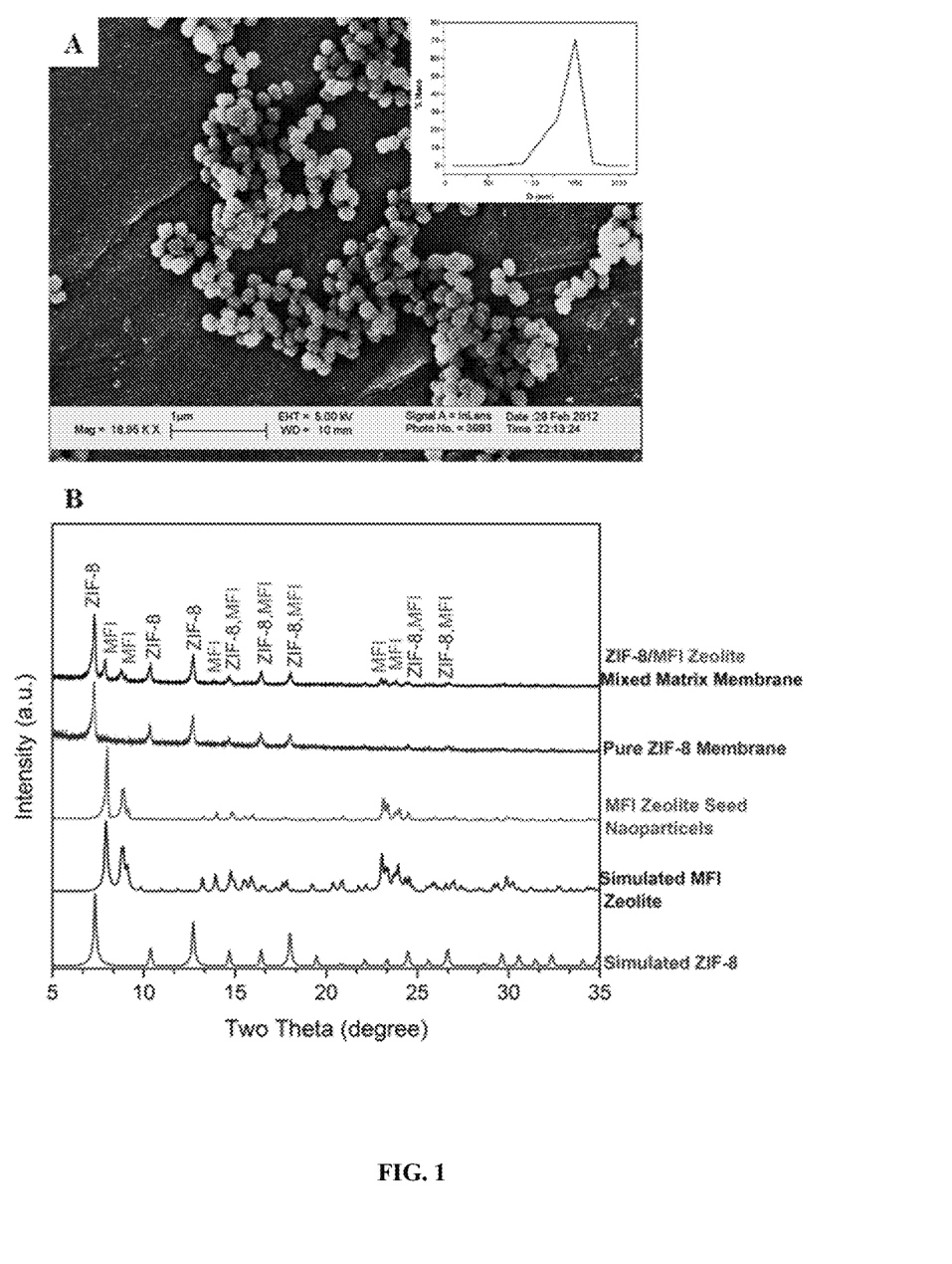
FIG. 1A shows a scanning electron microscope image (SEM) and crystal size distribution (inset) of calcinated MFI nanoparticles according to an example embodiment of the disclosure.
FIG. 1B shows a series of powder x-ray diffraction (XRD) patterns according to an example embodiment of the disclosure.

According to various other embodiments, MFI nanocrystals of highly uniform size, e.g., about 141±19 nm, are synthesized according to known methods or otherwise, and then characterized by SEM and XRD to confirm both their crystallinity and size distribution. See, for example, FIG. 1. Specifically, FIG. 1 illustrates the powder XRD pattern of the membrane having characteristic peaks for both MFI and ZIF-8.

Using an IMMP methodology, MFI nanocrystals can also be directly incorporated, e.g., dispersed, into the of ZIF-8 membranes along one or more inner surfaces of a macroporous PAI hollow fiber support during the membrane growth phase.

Example molecular separation devices produced according to the processes disclosed herein allow crystallization of MOF membranes at a liquid-solid interface created at or near the PAI hollow fiber surface. Crystallization of MOF membranes are controlled by manipulating the supply of reactants including, e.g., $Zn^{2+}$ ions in 1-octanol; 2-methylimidazole linkers in water; and in an opposing-reactants geometry from the bore and shell side of the fiber, respectively.

Other example embodiments comprise MFI nanoparticles pre-treated with an amine, e.g., 1,3-diaminopropane, in order to improve interaction between the $Zn^{2+}$ ions and the MFI/zeolite surfaces. Facilitating surface interactions induces the zeolite surfaces to participate in ZIF-8 membrane growth, leading to incorporation of MFI into the ZIF-8 membrane matrix.

Figure 2:
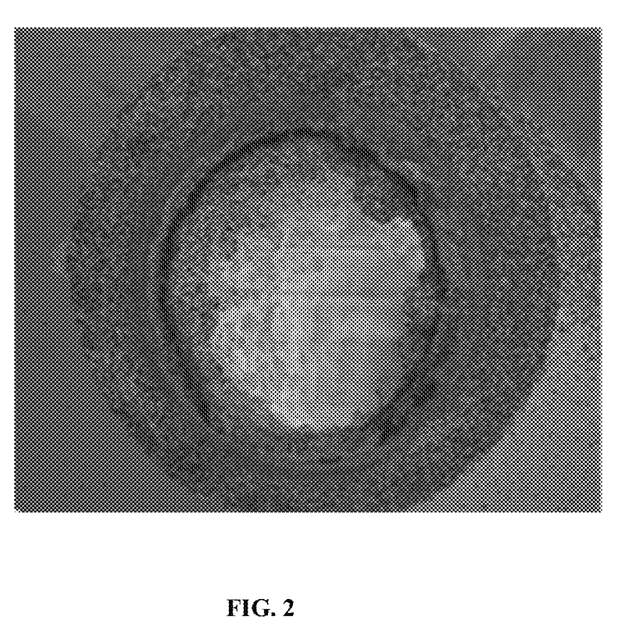
FIG. 2 shows cross-section SEM images and energy dispersive X-ray (EDX) elemental map overlays (red: Zn, green: Si) according to an example embodiment of the disclosure.

In further embodiments, pre-treatment of MFI nanoparticles with an amine, e.g., 1,3-diaminopropane, comprises one amine group capable of reacting with the external surface silanol group of a zeolite nanoparticle, and a second amine group capable of forming a complex with $Zn^{2+}$ ions. In certain embodiments, failure to pre-treat MFI nanoparticles may prevent efficient incorporation of MFI nanoparticles into growing ZIF-8 membranes, and production of a loosely packed layer as shown in FIG. 2.

Figure 3:
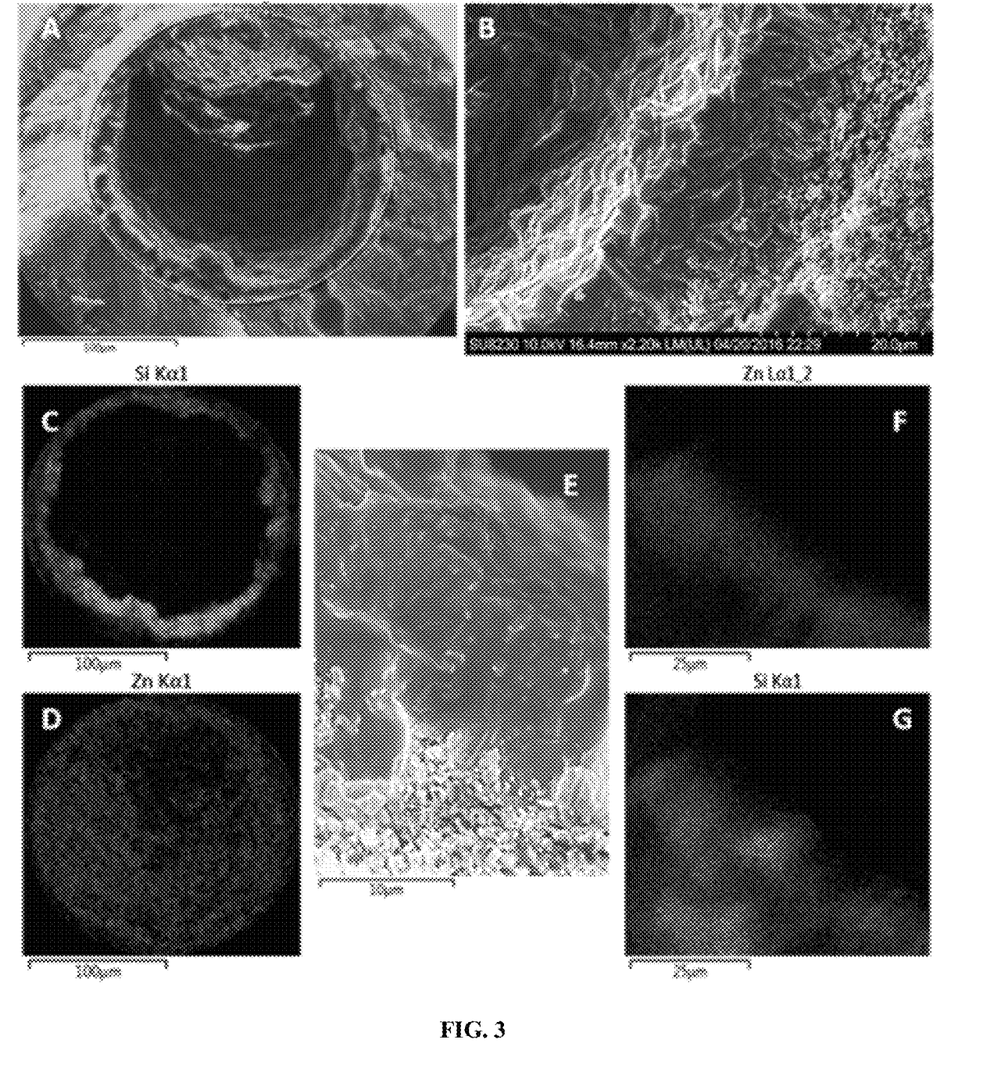
FIGS. 3A-G show a series of SEM images and EDX elemental maps according to an example embodiment of the disclosure.

In other example embodiments, a ZIF-8/MFI MMM is characterized. For example, FIGS. 3A and 3B show low-magnification cross-sectional SEM images indicating the formation of a ZIF-8/MFI MMM as a continuous layer on an inner surface of a hollow fiber support. FIGS. 3C and 3D show EDX elemental maps for Si and Zn, respectively, based upon FIG. 3A, which further indicates uniform dispersion of both MFI and ZIF-8 in the cross-section of the MMM. In FIG. 3D, the Zn signal appears throughout the bore cross-sectional area due to the large surface signal from the membrane inside the fiber. In the example embodiment of FIG. 3E, a high-magnification SEM image of the MMM cross-section is shown, in which MFI nanoparticles are observed embedded in the ZIF-8 membrane. In the example embodiments of FIGS. 3F and 3G, EDX elemental mapping based upon the SEM image of FIG. 3E is shown, thereby confirming the localization of MFI (Si) and ZIF-8 (Zn) to the same membrane layer.

Another example embodiment comprises a molecular separation device having a plurality of nanocrystalline members configured form a mixed-matrix of nanoporous structure along bare PAI support fiber as shown in FIGS. 4A and 4B. However, in other embodiments the PAI support fiber is used only as a temporary or transient support structure. In one example embodiment, a molecular separation device comprises a nanoporous structure formed by mixing a plurality of crystalline nanoparticles, so that a plurality of nanoporous structures form along the PAI support fiber. Sufficient additional processing will remove the PAI support fiber altogether (or nearly so), thereby resulting in a crystalline molecular separation device. In one specific embodiment of the technique, the PAI support fiber is dissolved using a solvent, e.g., dimethylformamide (DMF).

Figure 4:
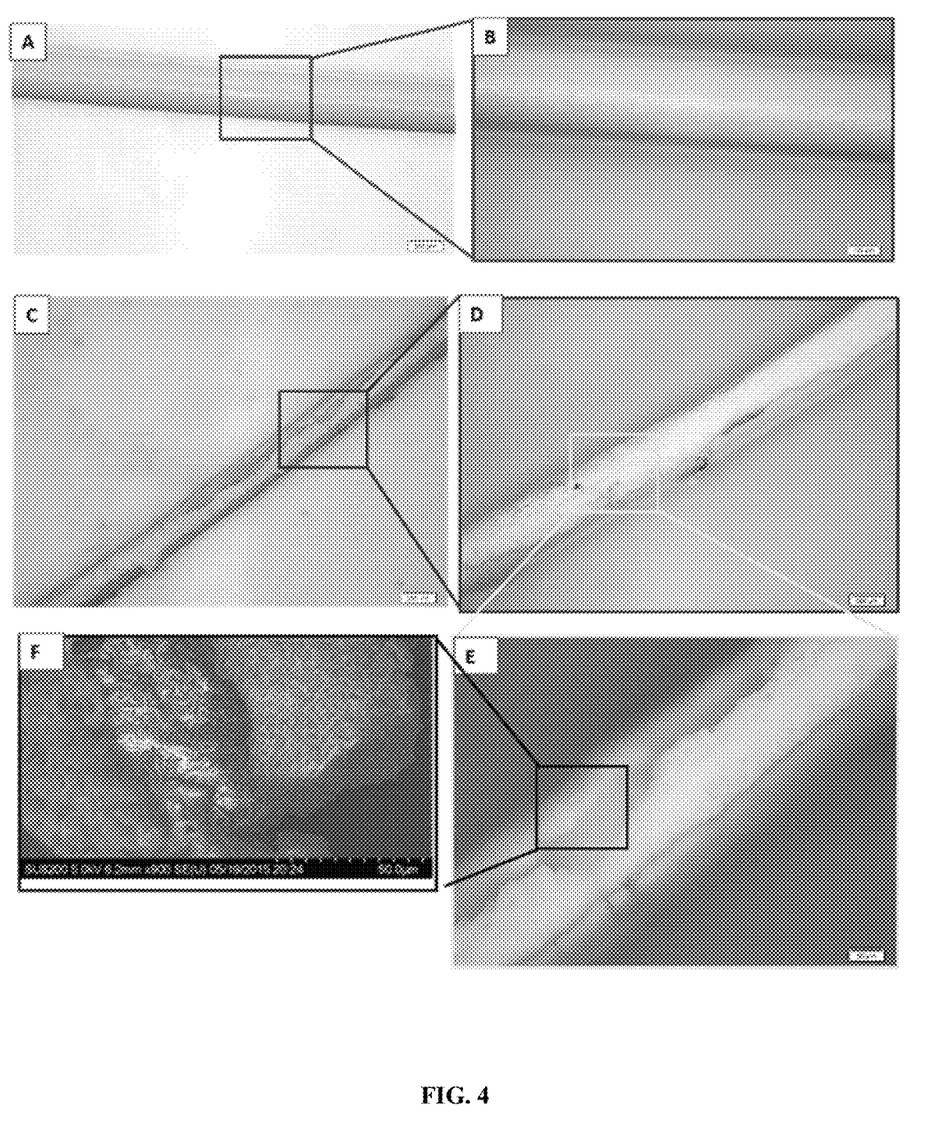
FIGS. 4A-F show images of a poly(amide)imide (PAI) hollow fiber support/substrate and formation of a completely nanoporous mixed-matrix-membrane before and after PAI removal according to an example embodiment of the disclosure.

When the transient PAI support fiber is removed by dissolution, the residual MMM "skin" will remain as a result of the process. See, for example, FIG. 4. In such manner, a residual MMM skin comprising a molecular separation device is achieved, and can be recovered for further characterization. In the example embodiments of FIGS. 4C, 4D, and 4E, optical microscopic images of MMM "flakes" are shown at increasing magnification; FIG. 4F comprises a still higher magnification SEM image of the MMM flake.

Figure 5:
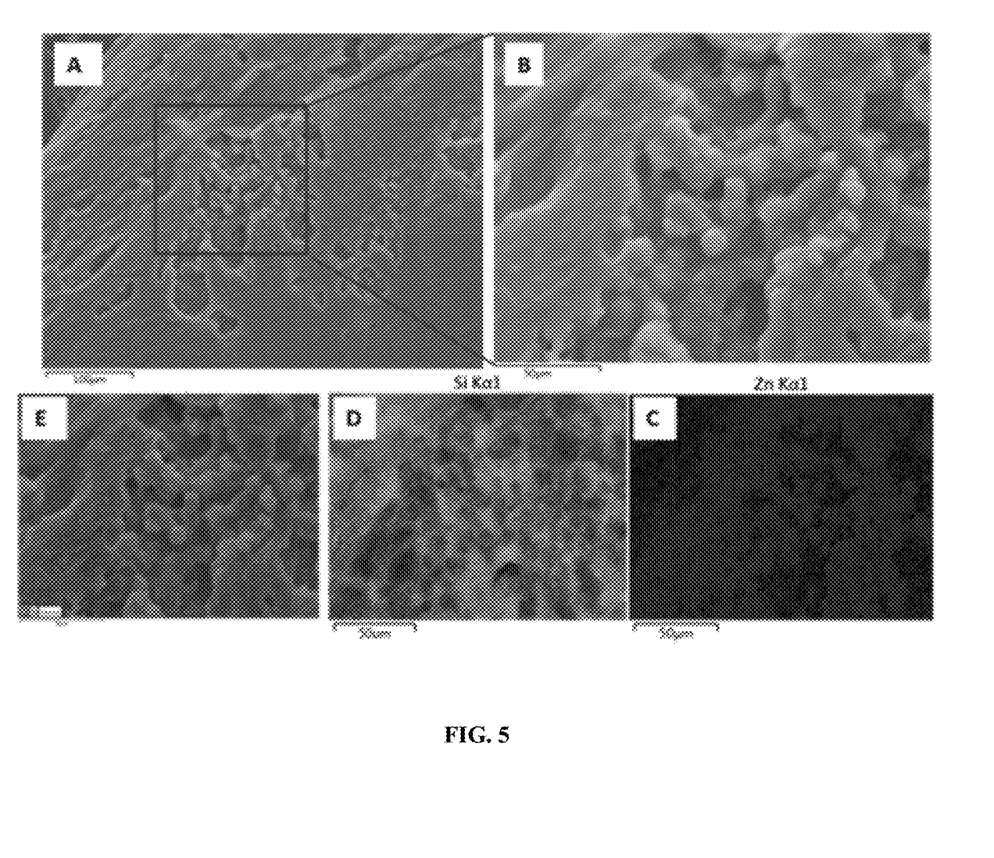
FIGS. 5A-E shows SEM images and EDX element maps of a ZIF-8/MFI membrane flake according to an example embodiment of the disclosure.

In the example embodiment of FIG. 5, SEM imaging and EDX mapping of the recovered MMM flakes are shown that confirm the MMM morphology. For example, FIGS. 5A and 5B are SEM images showing MFI nanoparticles embedded in a ZIF matrix, while FIGS. 5C, 5D, and 5E show EDX mapping of Si and Zn with intimate contact of zeolite and ZIF phases in the form of a single hybrid membrane.

Figure 6:
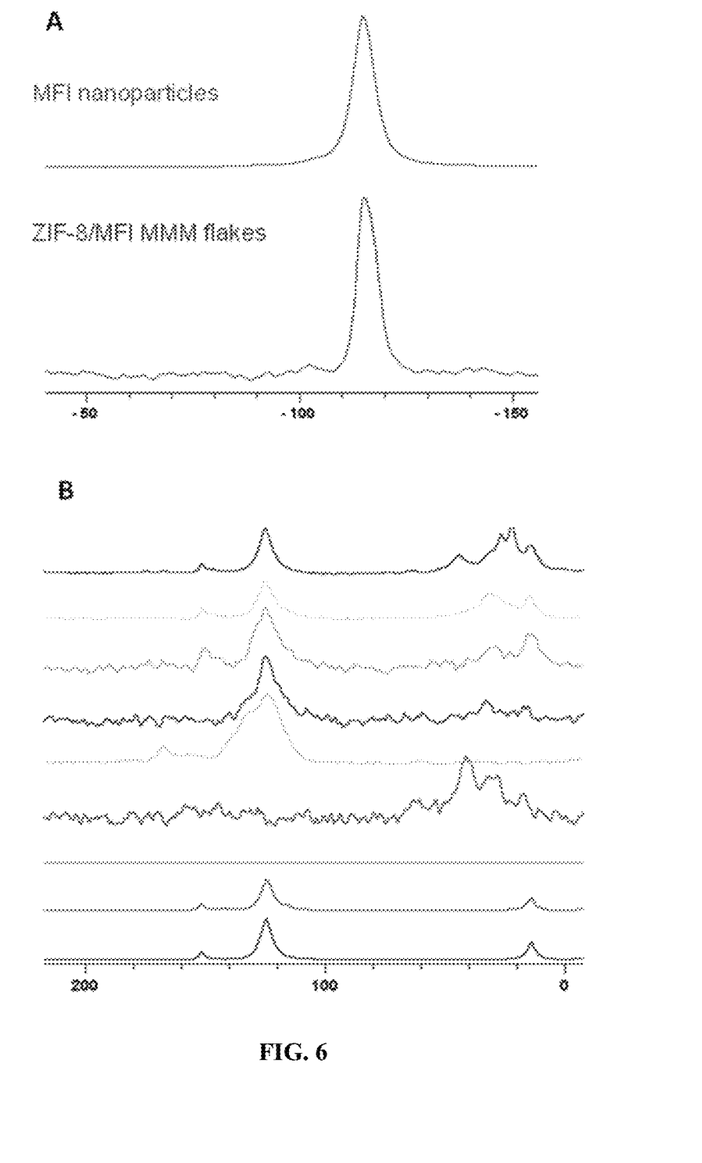
FIGS. 6A-B are graphical illustrations of a series of nuclear magnetic resonance spectra (NMR) according to an example embodiment of the disclosure.

In the embodiment of FIG. 6A, $^{29}Si$ DP-MAS NMR spectra of MFI nanoparticles and the ZIF-8/MFI MMM flakes with an approximately −115 ppm chemical shift characteristic of MFI are clearly visible, thereby confirming the presence of MFI nanoparticles in the flakes. In the example embodiment of FIG. 6B, $^{13}C$ CP-MAS NMR spectra of ZIF-8 crystals, bare PAI hollow fiber, MFI nanoparticles before and after pre-treatment with 1,3-diaminopropane, ZIF-8 membrane flakes, and ZIF-8/MFI MMM flakes are shown. Functionalization of MFI nanoparticles by pre-treatment with amine 1,3-diaminopropane is also evident from the peaks at 42 and 39 ppm, which correspond to the carbons attached to the amine group and the middle carbon respectively.

The $^{13}C$ chemical shifts for crystalline ZIF-8 [Zn(2-MeIM)$_2$] are known to be associated with the methyl group carbon, the carbon located between two nitrogen atoms of the imidazolate, and the two carbons of the imidazolate ring, respectively. These chemical shifts are seen in the pure ZIF-8 membrane flakes, produced according to an exemplary embodiment of the present disclosure. Characterization of ZIF-8/MFI MMM shows the ZIF-8 chemical shifts as well as those arising from 1,3-diaminopropane. In one example embodiment, the negligible presence of PAI in the flake samples is also confirmed by comparison to the spectrum of the bare PAI fiber.

Figure 7:
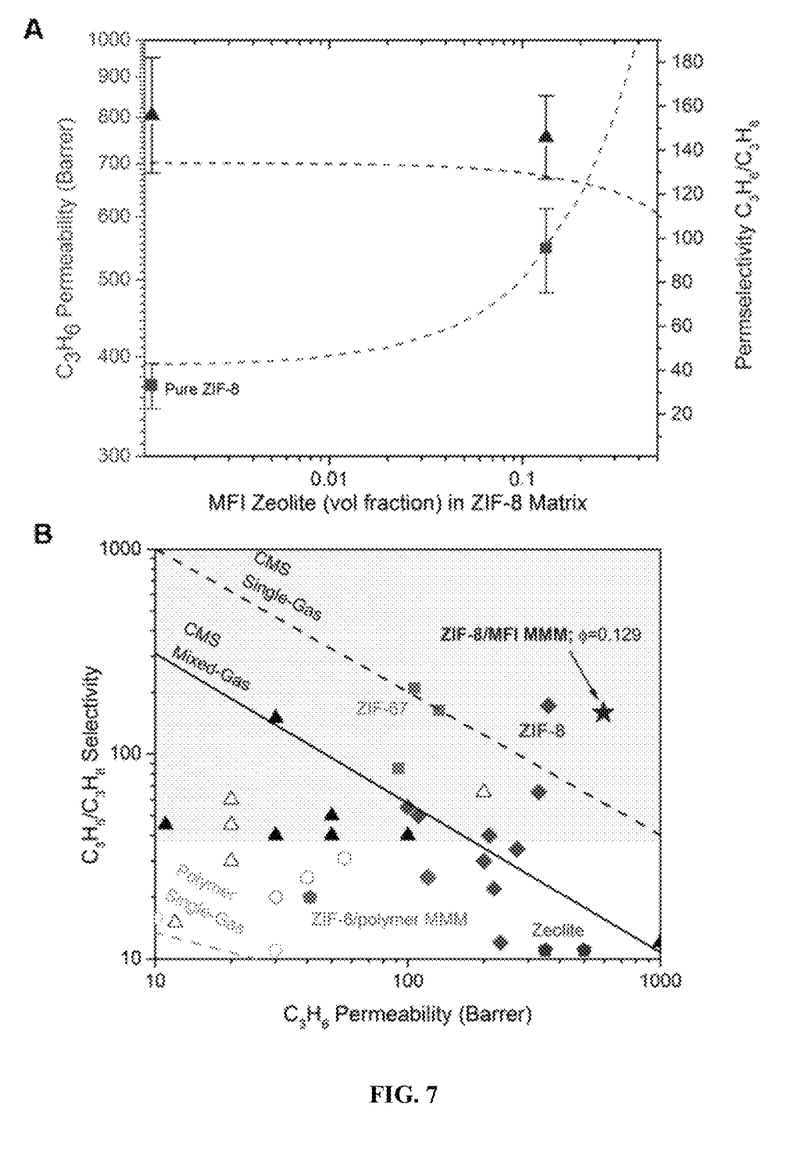
FIG. 7A shows predictive and experimental measurements of $C_3H_6$ permeability and $C_3H_6/C_3H_8$ permselectivity according to an example embodiment of the disclosure.
FIG. 7B shows experimental measurements comparing $C_3H_6/C_3H_8$ separation performance between various molecular separation devices according to an example embodiment of the disclosure.

Molecular separation devices are evaluated based on chemical permeability and the preferential permeation of select molecular species, i.e., permselectivity. FIG. 7A compares the $C_3H_6$ permeability and $C_3H_6/C_3H_8$ mixture permselectivity in pure ZIF-8 membranes in yet another example embodiment.

To compute Maxwell model-based predictions, known ($C_3H_6$, $C_3H_8$) permeability values for ZIF-8 of (390, 2.9) Barrer and MFI (8099, 3619) Barrer are used. For ZIF-8, known permeability values based upon similar measurements can be used directly. To obtain an MFI volume fraction $\varphi$, the Si/Zn atomic (molar) ratio is obtained by EDX on the ZIF-8/MFI membrane flakes. Based upon the known chemical formulae of ZIF-8 (Zn(2-MeIM)$_2$) and MFI (SiO$_2$), and their known densities (0.769 and 1.78 kg. m$^{-3}$, respectively), there is a unique arithmetic relationship between the Si/Zn atomic ratio and the volume fraction of MFI nanoparticles in the ZIF-8/MFI MMM.

In the example embodiment of FIG. 7B, experimentally observed $C_3H_6$ permeability of a pure ZIF-8 membrane is shown as 360±104 Barrer, whereas $C_3H_6$ permeability of another example embodiment, e.g., a ZIF-8/MFI MMM, is shown as 548±67 Barrer at $\varphi=0.129$. Moreover, the exemplary ZIF-8/MFI MMM embodiment maintains a sharp $C_3H_6/C_3H_8$ selectivity. Furthermore, the measured permeabilities and selectivities are consistent with the Maxwell predictions.

In the example embodiment of FIG. 7B, established $C_3H_6/C_3H_8$ single-component and binary-mixture permeabilities and selectivities at approximately the same conditions are shown, e.g., 25-100° C. and 1-2 bar, for different classes of known single-phase MMM, e.g., polymeric, CMS, zeolite, ZIF, and polymer-based MMMs. Specifically, open/closed symbols indicate single/mixed-gas measurements; circles illustrate polymers; triangles illustrate CMS; rhomboids illustrate ZIF-8; rectangles illustrate ZIF-67; pentagons illustrate zeolite; hexagons illustrate ZIF-8/polymer MMMs; stars illustrate ZIF-8/MFI MMM; and dashed (single-component) and solid (binary) lines illustrate Robeson-type 'upper bound' lines for conventional materials such as polymers and CMS.

The 'upper bound' lines for polymers and CMS materials are drawn based upon representative, best-case performance reported for conventional materials. The upper bounds for both binary-mixture separation devices and single-gas separation devices are also considered. The binary upper bound lines are lower than the single-gas lines since competitive adsorption or diffusion in a binary mixture typically lowers the membrane performance. Only materials with reasonable $C_3H_6/C_3H_8$ selectivities≥10 are shown, and there are no polymers with the required binary-mixture selectivity.

The separation characteristics of the present ZIF-8/MFI MMMs, especially the permeability, are far above all previously reported membranes, and are the result of the all-nanoporous nature of these hybrid membranes.

The approach disclosed herein provides MOF and ZIF membranes grown under relatively mild conditions, and enables the matching of different high-performance, nanoporous materials with complementary characteristics and fabricated membranes that enter a previously inaccessible region of the performance cycle.

The foregoing specification is comprised for illustrative purposes only, and is not intended to describe all possible aspects of the present invention. Moreover, while the invention has been shown and described in detail with respect to several exemplary embodiments, those of ordinary skill in the relevant arts will appreciate that minor changes to the description, and various other modifications, omissions and additions may also be made without departing from either the spirit or scope thereof.

What is claimed is:

1. A molecular separation device consisting essentially of:
   a porous, polycrystalline membrane material, wherein the porous, polycrystalline membrane material comprises a metal-organic framework wherein the-metal-organic framework is ZIF-8 and is free of polymer material, and
   a porous, nanocrystalline material comprising a zeolite,
   wherein the zeolite is dispersed within the-metal-organic framework,
   wherein the zeolite provides a plurality of nanoporous structures; and
   wherein the molecular separation device is free of polymers formed from organic monomers.

2. The molecular separation device of claim 1, wherein the device is permselective.

3. The molecular separation device of claim 1, wherein the molecular separation device further comprises a completely nanoporous structure.

4. The molecular separation device of claim 1, wherein said device is configured to separate molecular species from liquids, gases and mixtures of liquids and gases.

* * * * *